US006964481B2

(12) United States Patent
Pho et al.

(10) Patent No.: US 6,964,481 B2
(45) Date of Patent: Nov. 15, 2005

(54) APPARATUS AND METHOD FOR PROJECTING IDENTIFYING INFORMATION ONTO SEATS

(75) Inventors: Hau T. Pho, Seattle, WA (US);
Melanie L. Kimsey, Seattle, WA (US);
Kevin Scott Callahan, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 56 days.

(21) Appl. No.: 10/720,935

(22) Filed: Nov. 24, 2003

(65) Prior Publication Data

US 2005/0110952 A1   May 26, 2005

(51) Int. Cl.⁷ .......................... G03B 21/00; G03B 21/26
(52) U.S. Cl. ........................... 353/12; 353/13; 353/28; 353/42; 353/122
(58) Field of Search ............................... 353/11–14, 28, 353/42, 43, 62, 97, 122

(56) References Cited

U.S. PATENT DOCUMENTS

| | | | | |
|---|---|---|---|---|
| 4,023,151 A | * | 5/1977 | Markham | 340/692 |
| 4,733,486 A | | 3/1988 | Gawell | 40/451 |
| 5,534,718 A | | 7/1996 | Chang | 257/98 |
| 5,926,867 A | * | 7/1999 | Buchanan | 4/661 |
| 6,177,887 B1 | * | 1/2001 | Jerome | 725/76 |
| 6,481,870 B2 | * | 11/2002 | Son | 362/259 |
| 6,578,795 B2 | | 6/2003 | Romca et al. | 244/122 R |

FOREIGN PATENT DOCUMENTS

| | | | | |
|---|---|---|---|---|
| JP | 02-3556 | * | 1/1990 | B60R 11/02 |
| JP | 10253760 | | 9/1998 | |
| JP | 10253760 | | 8/1999 | |
| JP | 2001-305989 | * | 11/2001 | G09F 9/00 |
| WO | WO 02/14085 A2 | * | 2/2002 | B60B 11/00 |

OTHER PUBLICATIONS

Kawasaki, Television Device for Vehicles, Translation of JP 02-3556 by Yanming Luo, Dec 29, 2004, by Schreiber Translations for the US Patent and Trademark Office.*
Hitachi, LTD. An image display system and the image display method, translation of JP 2001-305989, Machine translation by Derwent on Dec. 23, 2004.*
Retailer Information for Projection Clock, Model No. NU-860; Copyright 2000 Wireless Alarm Products, Inc. (www.wirelessalarm.com); Updated Mar. 21, 2002.
Wireless Alarm Products, Inc. advertisement for "Projection Clock" from Aug. 5, 2003.

* cited by examiner

Primary Examiner—Alan A. Mathews
Assistant Examiner—Andrew Sever
(74) Attorney, Agent, or Firm—Harness Dickey & Pierce P.L.C.

(57) ABSTRACT

A system and method for identifying seats within a mobile platform such as an aircraft, bus, ship, train, etc. A sensor subsystem detects when a door of the mobile platform is opened and transmits a wireless signal to each one of a plurality of projector subsystems. Each of the projector subsystems are disposed adjacent an associated seat of the mobile platform. Each projector subsystem projects an enlarged, optical signal with seat identifying information onto the seatback of its associated seat.

30 Claims, 4 Drawing Sheets

APPARATUS AND METHOD FOR PROJECTING IDENTIFYING INFORMATION ONTO SEATS

FIELD OF THE INVENTION

The present invention relates to projection systems for projecting information, and more particularly to a projection system and method for projecting unique, optical identifying information onto each one of a plurality of seats within a predefined area, to help individuals in locating a specific seat within said predefined area.

BACKGROUND OF THE INVENTION

In a number of applications, such as in sports stadiums, theatres, and even inside mobile platforms such as aircraft, ships, busses, trains, etc., it would be desirable to more prominently display a seat number or other identifying information to help an individual locate his/her specific seat from within a plurality of seats. Presently, in many venues seat information is often provided in the form of relatively small printed information disposed on some portion of the seat. In mobile platforms such as aircraft, the seat identifying information is often disposed above the seats and underneath the overhead storage bins.

It would be highly desirable to provide some form of device that can provide information directly on the seat itself in larger print, to better identify each seat within a large plurality of seats to thus aid an individual in locating a specific seat.

SUMMARY OF THE INVENTION

The present invention is directed to a system and method for displaying an optical signal on a structure, such as a seat, to uniquely identify the structure from a plurality of similar structures in a given predefined area, to thus aid an individual in locating a specific one of the structures. In one preferred form—the system is especially well adapted for supplying an optical signal onto each one of a plurality of seats within a predefined area, such as within a sports stadium, a theatre, or within a mobile platform such as a bus, train, aircraft, ship, etc. In one preferred embodiment involving a mobile platform, for example an aircraft, the system includes a sensor subsystem for detecting when a door of the mobile platform is open. A plurality of projector subsystems are each located adjacent an associated one of a plurality of seats within the mobile platform so as to be generally facing the seats. Each projector subsystem includes a projector and a sensor for detecting if an individual is present in the seat associated with a given projector subsystem. Optionally, each projector subsystem may also include a receiver for receiving wireless signals, and the sensor subsystem may comprise a transmitter for transmitting wireless signals to the receiver.

When the door is open and the sensor of the projector subsystem detects that no individual is present in its associated seat, then the projector subsystem generates an optical signal which is projected onto the seat identifying the seat. The optical signal may provide a seat number, a row number or any other pertinent information that assists an individual in locating a specific one of a plurality of seats within the mobile platform.

In a preferred embodiment each projector subsystem is powered by a battery disposed within a housing that houses the projector subsystem. In an alternative embodiment, each projector subsystem is powered by electrical power supplied from an external source, for example, an auxiliary power unit (APU) of a mobile platform such as an aircraft.

In one preferred form the sensor subsystem associated with the door of the mobile platform also includes a control for enabling and disabling the sensor subsystem. Only when this control is enabled will the sensor subsystem be able to transit a signal to the projector subsystems, provided that the door is also sensed as being in an open condition. A door "open" signal can also be obtained from an existing sensor associated with the door or from a data bus on the mobile platform that provides such a signal.

In one preferred form the present invention is implemented on a commercial aircraft while integrating the projector subsystem into a seat-back tray table located on the back of each seat. The projector subsystem in this embodiment protrudes only slightly from the lower surface of the tray table, or not at all.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
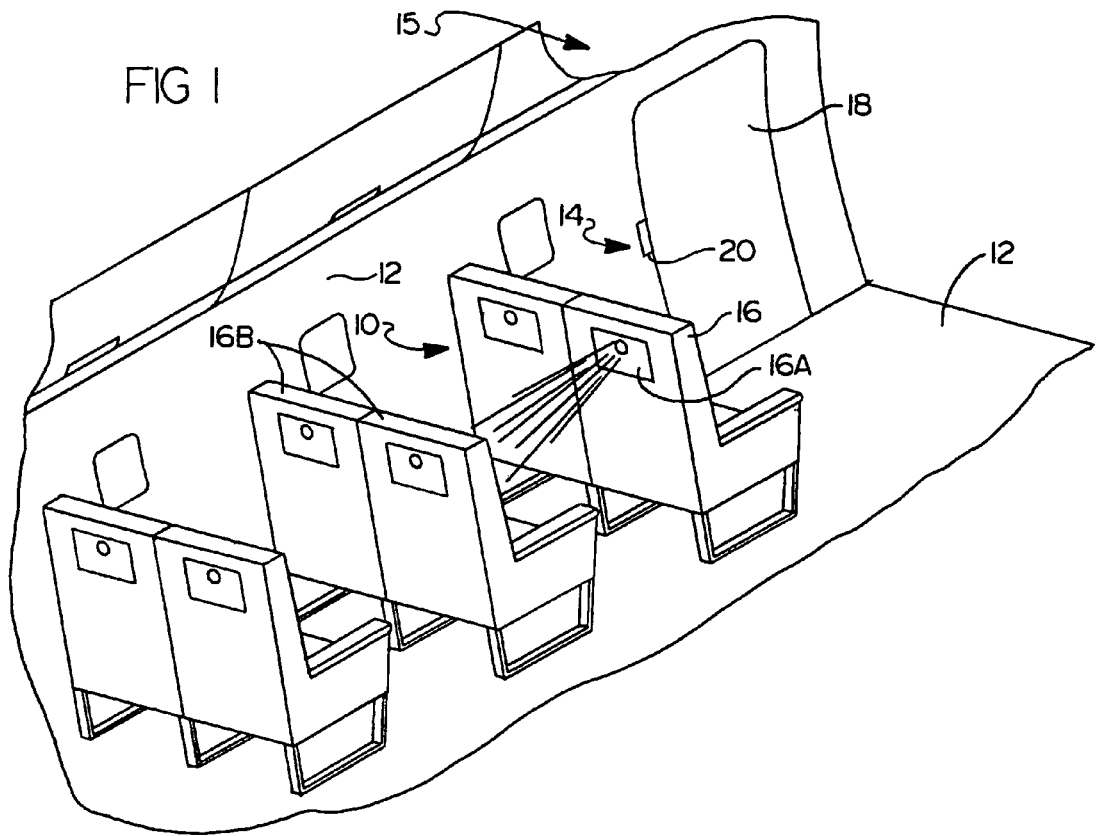
FIG. 1 is a perspective view of a portion of an interior of a mobile platform, such as an aircraft, incorporating a preferred embodiment of the present invention.

Referring to FIG. 1, there is shown a projection system 10 in accordance with a preferred embodiment of the present invention. The projection system 10 is shown incorporated within a cabin 12 of a mobile platform 15 such as an aircraft. However, it will be appreciated that the system 10 is not limited to use with only aircraft. For example, the system 10 is readily applicable for use in sports stadiums, theatres, concert halls, auditoriums, etc. The system 10 is also well adapted for use with mobile platforms such as busses, trains, ships, etc., or any other structure/platform where it would be helpful to provide identifying information to a plurality of similar structures (i.e., not necessarily even seats) to aid an individual in locating a specific one of the structures.

The projector system 10 generally includes a projector subsystem 12 and a sensor subsystem 14. An independent projector subsystem 12 is, in one preferred implementation, mounted on a lower surface of a fold-down, seat-back tray table 16a of each seat 16 on the mobile platform 15. Thus, each projector subsystem 12 is uniquely associated with a single seat within the mobile platform 15. Each projector subsystem 12 is further disposed so as to be facing the seat immediately behind it, which is uniquely associated with a given one of the projector subsystems. It will be appreciated also that the projector subsystem 12 could be incorporated possibly above or below the tray table 14 as long as the projector subsystem 12 is generally facing the seat behind it, and more preferably facing a seat back portion 16b of its associated seat 16.

The sensor subsystem 14, in one preferred form, is disposed adjacent a door 18 of the mobile platform 15. The sensor subsystem 14 includes a sensor 20 which detects when the door 18 is opened. In one preferred form this sensor comprises an optical sensor. Alternatively, an existing sensor associated with the door 18 could also be used, or a "door open" signal could be obtained from a data bus on the mobile platform 15 that provides a signal in accordance with an existing door position sensor. Alternatively, a simple mechanical switch could be integrated into the area adjacent the door, or into the door itself to perform this function.

Figure 2:
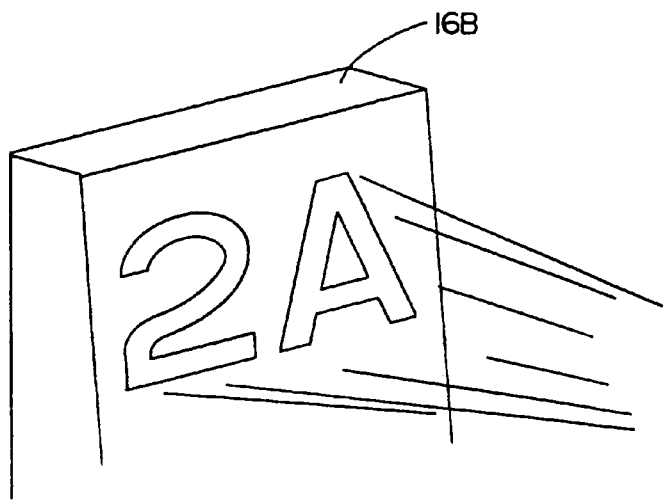
FIG. 2 is an enlarged view of a portion of one of the chairs shown in FIG. 1 illustrating the projection of the seat number for the chair onto a seat back portion of the chair in highly enlarged form.

In one preferred form, the sensor subsystem 14 transmits an electromagnetic wave signal (i.e., a wireless signal) to all of the projector subsystems 12 located within the mobile platform 15. This identifies to all the projector subsystems 12 that the "door open" signal is being generated. When this condition occurs, the projector subsystems 12 each are turned on and begin projecting information onto the seat back portion 16b of their associated seats 16. FIG. 2 illustrates the enlarged seat number that is projected onto the seat back portion 16b of the given seat 16. The enlarged presentation of the seat number makes the seat very easily identified by individuals boarding the mobile platform 15, and can therefore expedite boarding of the mobile platform 15.

Figure 3:
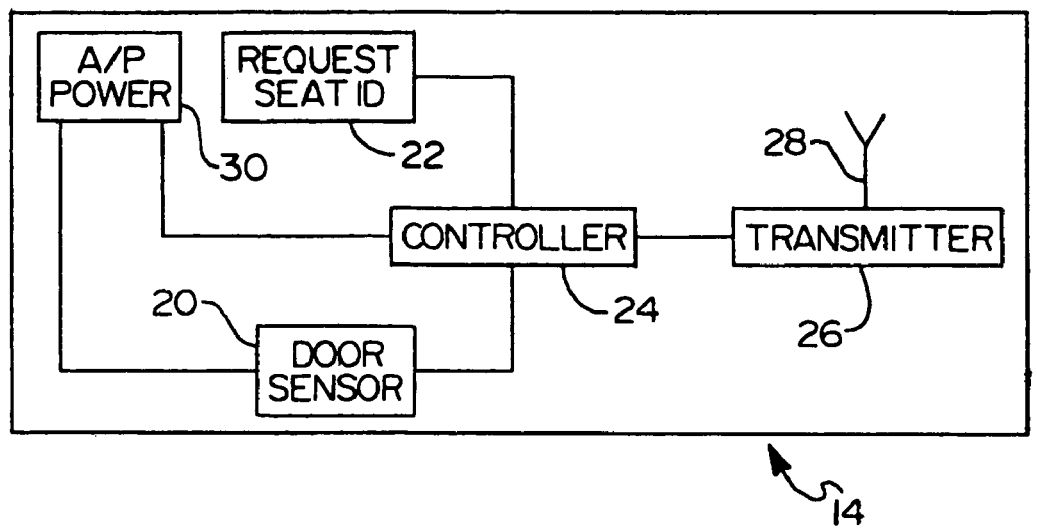
FIG. 3 is a simplified circuit diagram of a door sensor subsystem used to detect the opening of the door of the mobile platform of FIG. 1.

With reference to FIG. 3, the sensor subsystem 14 is shown in simplified block form. The sensor system 14 includes the door sensor 20, a "request seat identification" (ID) control 22, a controller 24, a transmitter 26 and an antenna 28. Power is supplied, in one preferred form, by an auxiliary power (A/P) power unit 30 of the mobile platform 15. However, it will be appreciated that a battery could just as readily be used to power the sensor subsystem 14. The use of a battery would simplify retrofitting of the system 10 into an existing mobile platform, such as an aircraft, but would obviously require periodic replacement or recharging.

The request seat ID control 22 is preferably a manually activatable control that allows an individual to enable or disable the sensor subsystem 14. Preferably a pushbutton is used for the control 22, although a membrane switch, toggle style switch, or any other suitable type of switching component could also be used. Only when the controller 24 receives a "on" signal from the control 22 and a signal from the door sensor 20 indicating that the door is in an "open" condition, does the controller generate an output to the transmitter 26 turning on the transmitter. When the transmitter 26 is powered on, it generates an output signal to antenna 28. Antenna 28 transmits an electromagnetic wave signal to all of the projector subsystems 12. The transmitter 26 is preferably a low frequency single-channel transmitter. The control 22 allows flight crew members on the mobile platform 15 to disable the sensor subsystem 14 when the door 18 of the mobile platform 15 needs to be left open, but when no boarding of the mobile platform 15 is taking place (such as when maintenance of the mobile platform is being performed). The control 22 also enables members of the flight crew of the mobile platform 15 to disable the sensor subsystem 14 for any other reason.

The transmitter 26 is also a relatively low power transmitter. The transmitter 26, in one form, has an output in the range of about 0.01–0.2 watt and operates over a bandwidth of about 1 MHz–14 MHz with a center frequency of about 866 MHz.

Figure 4:
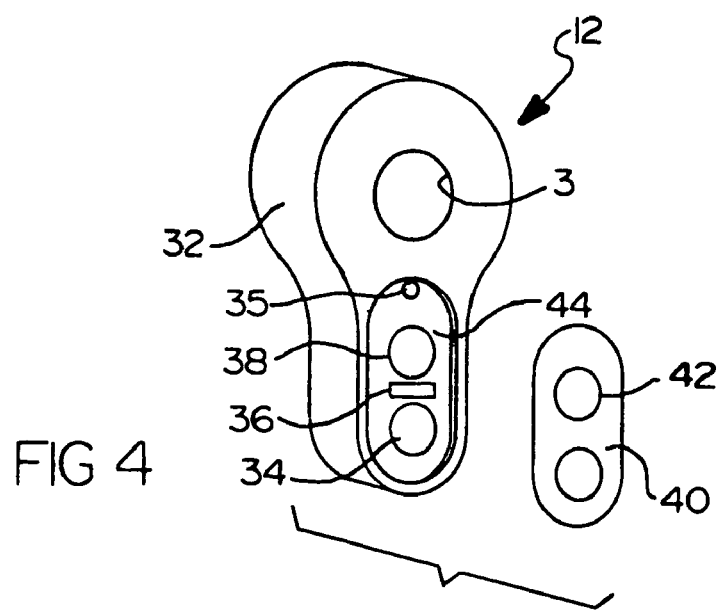
FIG. 4 is a perspective view of the projector subsystem.

Referring to FIG. 4, a simplified perspective view of one of the projector subsystems 12 is illustrated. The projector subsystem 12 has a main housing 32 having a lens 33 for enabling the optical signal generated to be emitted through the housing 32. A detection system comprising a sensor, preferably an infrared sensor 34, is mounted within the housing 32, as is a manual on/off switch 35, a control panel 36 and a readily removable and replaceable battery 38. A removable cover 40 having a lock 42 is placed over an opening 44 in the housing 32 to cover the battery 38, the control panel 36 and the on/off switch 35 so as to prevent tampering therewith by unauthorized individuals. The housing 32 forms a relatively thin structure, preferably on the order of about 0.5 inch (12.5 mm) thick. The overall length of the housing 32 may vary but one preferred form is about 2.5 inch (63 mm) in length. The housing 32 may be formed from high strength plastic, metal or any other suitable material. It may be held within a suitable recess in its associated seat back tray table or it may be secured thereto by other means such as hooks or even adhesives. If the housing 32 is mounted in a recess in the seat back tray table 16a, then the housing will project only slightly above the surface of its associated tray table or not at all. In any of the above-described mounting implementations, the projector subsystem 12 forms a relatively unobtrusive, lightweight means for projecting an optical signal onto an associated seat back 16b which it faces. The projector subsystem 12 could alternatively be hard-wired to the sensor subsystem 14 via an existing wiring harness on the mobile platform 15.

Figure 5:
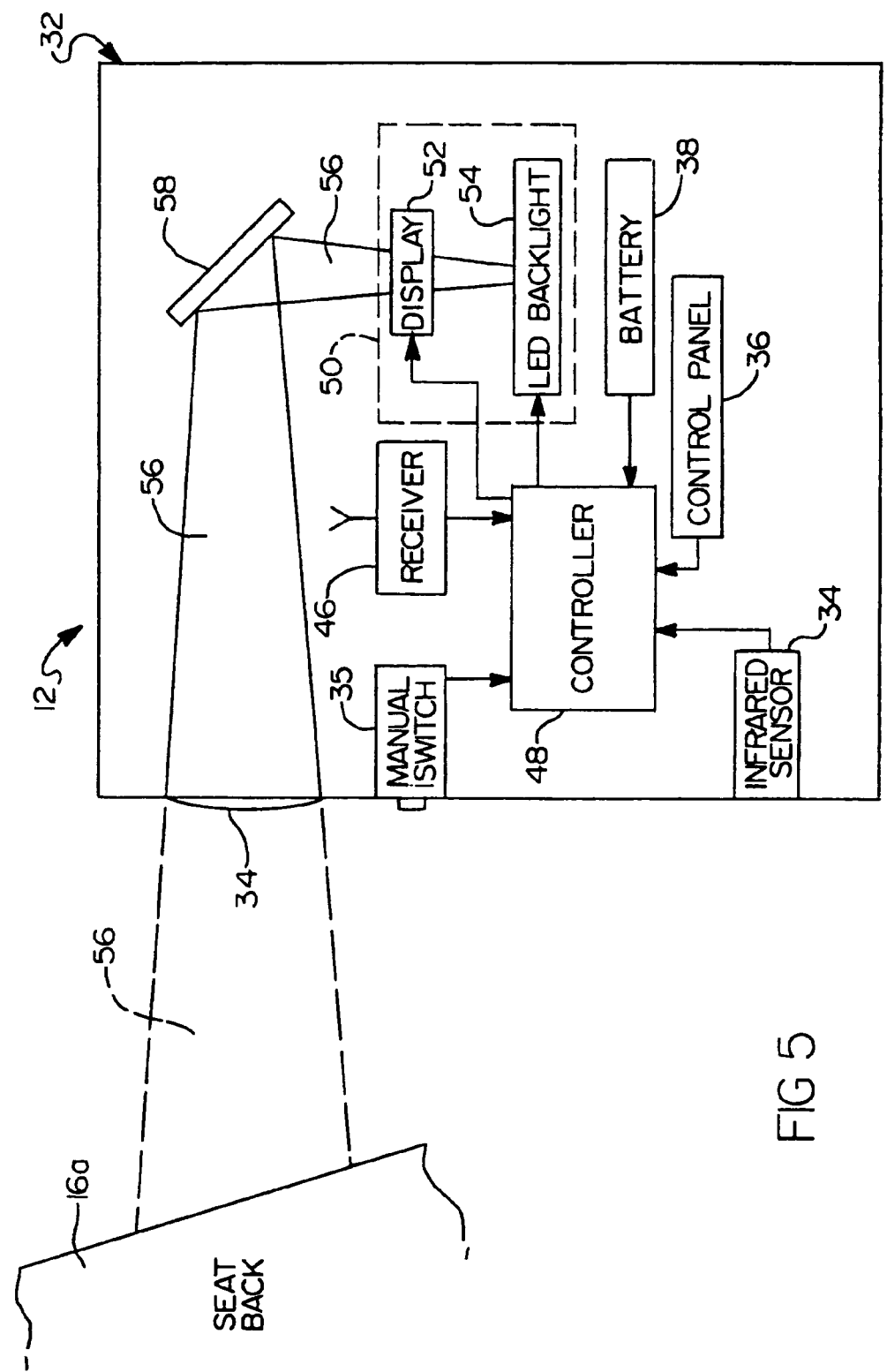
FIG. 5 is a simplified block diagram of the projector subsystem of the present invention that is mounted in the fold down tray table, as shown in FIG. 1.

Referring to FIG. 5, a simplified block diagram of the projector subsystem 12 is shown. The projector subsystem 12 includes an electromagnetic wave receiver 46, which may comprise a radio frequency (RF) receiver, a controller 48, the infrared sensor 34, the manual on/off switch 35, the control panel 36 and a projector component 50. The battery 38 is used to power all of the components within the projector subsystem 12. The projector component 50, in one preferred form, comprises a liquid crystal display 52 and a light emitting diode (LED) back light 54. The LCD 52 projects seat number information 56 onto a mirror 58 which reflects the signal generally perpendicularly towards the seat back 16b associated with the given projector subsystem 12. The controller 48 may comprise a microprocessor, an analog controller, or any other form of suitable circuit or control element for interfacing with the various components of the projector subsystem 12. The control panel 36 allows a specific seat number or other form of information to be programmed into the projector subsystem 12 as needed.

With further reference to FIG. 5, in lieu of the LCD 52, a silk-screen image display may be incorporated. If the LCD 52 and LED back light 54 are incorporated, then the LED back light 54 is selected to provide preferably at least a 3:1 contrast ratio between the projected image and the background. Such a contrast ratio is provided by a single LED with a luminous flux of about 25 lumens. This brightness is based on a seatback luminance of approximately 17 $cd/m^2$ (estimated from actual side wall luminance measurements) and a total light path distance of about 27.8 inches. The distance of about 27.8 inches is merely given for exemplary purposes, but in aircraft applications, it is anticipated that the distance between the projector subsystem 12 and the seatback 16b onto which the optical image is being projected by the projector subsystem 12 will be about 27.8 inches, although this distance could obviously be varied. LEDs that meet this brightness criteria are presently widely commercially available. Such LEDs furthermore consume very little power, typically on the order of about one watt.

The LCD 52 may also vary significantly in size, but in one preferred form is approximately 1.2 inch (30.48 mm) by 1.0 inch (25.4 mm) in overall dimensions, and has a preferably about 0.5 inch (12.7 mm) character size. Such LCDs are also widely commercially available. The use of the mirror 58 allows the optical signal to be turned approximately 90°, and also to achieve the optical path length between the LCD 52 and the lens 33 needed to project an enlarged optical signal after the seatback 16b. Merely by way of example, to project an 8.0 inch (20.32 cm) image onto the seatback 16b, the LCD 52 would need to be placed approximately 1.625 inches (41.275 mm) from the lens 33. With the limited thickness of the housing 32, the use of the mirror 58 allows the optical path length to be extended within the housing 32 to produce the needed image size on the seatback 16b. Alternatively, if a thicker housing 32 is used, then use of the mirror 58 may not be needed.

With further reference to FIG. 5, the infrared sensor 34 is powered on whenever the controller 48 is detecting that a signal is being received by receiver 46. Infrared sensor 34 detects the presence of an individual passing in front of the seat 16, or if the individual has seated himself/herself in the seat 16 associated with the projector subsystem 12. If either of these conditions are detected, the infrared sensor 34 stops transmitting an output signal to the controller 48. The controller 48 immediately powers down the LCD 52 and the LED backlight 54. Thus, an individual can remain seated in his/her seat 16 without having the seat identifying information projected onto him/her. This also conserves battery power because when an individual takes his/her seat on the mobile platform 15, there is no need for the seat identifying information to be projected onto the individual's seat 16. Furthermore, this control scheme assures that even if an individual passes in front of the infrared sensor 34, that the optical signal 56 will only be turned off momentarily. As soon as the individual moves past the field of view of the infrared sensor 34, the sensor will then again turn on, thus indicating to the controller 48 that the seat 16 is unoccupied. The controller 48 will then immediately turn on the LCD 50 and the LED backlight 54 and begin re-projecting the seat identifying information.

Figure 6:
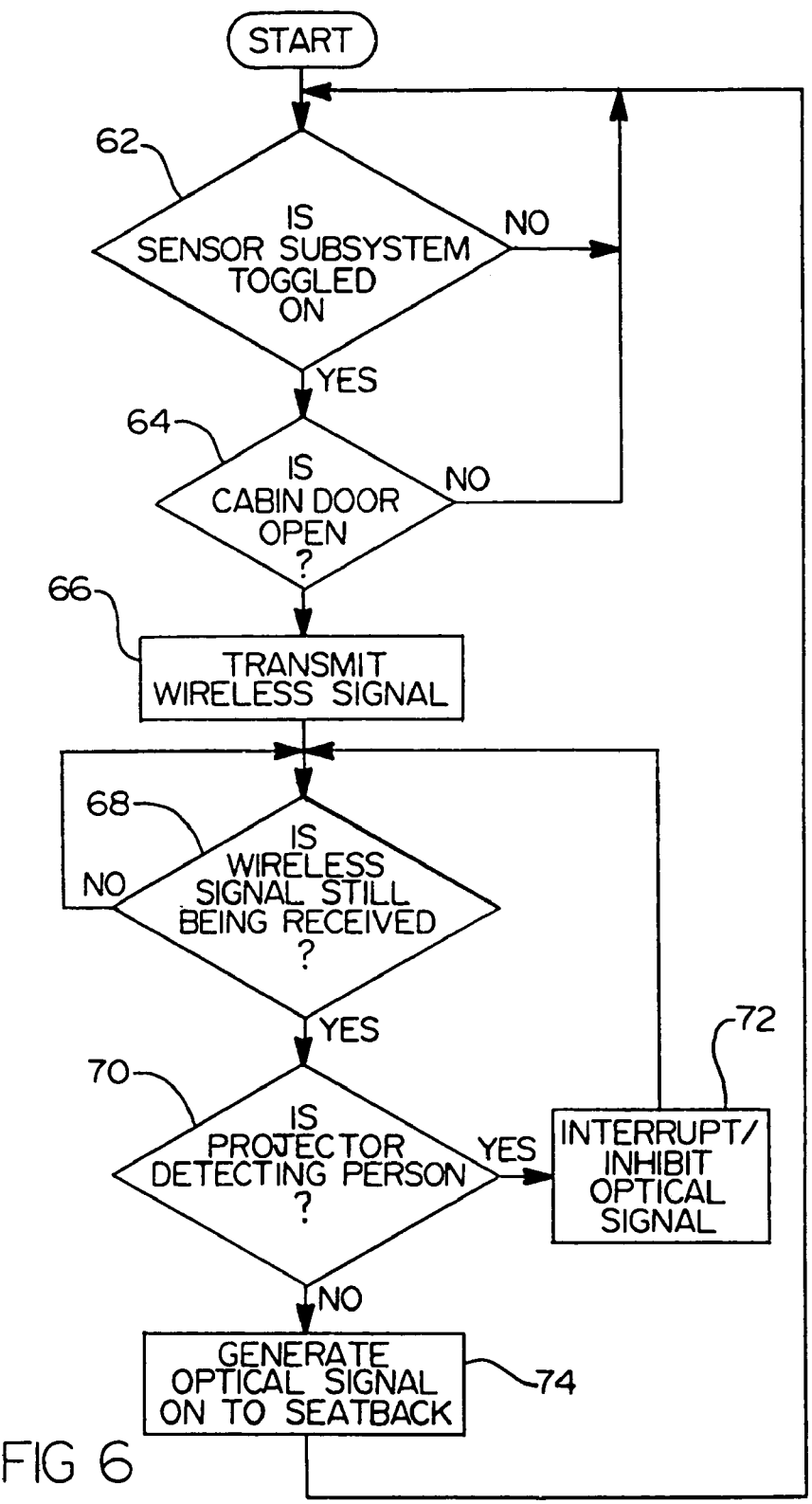
FIG. 6 is a flow chart of the sequence of operations typically performed by one preferred embodiment of the present invention.

Referring to FIG. 6, a description of the overview of operation of the system 10 will be provided. Initially, a check is made if the sensor subsystem 14 is toggled on via control 22, as indicated at operation 62. If the sensor subsystem 14 is toggled on, then a check is made via door sensor 20 if the cabin door 18 is also open, as indicated at operation 64. If the door 18 is opened, then the sensor subsystem 14 transmits a wireless signal to all of the projector subsystems 12 within the mobile platform 15, as indicated at operation 66.

The projector subsystem 12 initially monitors to determine if the wireless signal from the sensor subsystem 14 is being received, as indicated at operation 68. If the answer to this inquiry is "no", then operation 68 is repeated. If the answer is "yes", then operation 70 is performed. At operation 70, projector subsystem 12 initially makes a check to determine if its associated infrared sensor 34 is detecting the presence of an individual. If the answer to this test is "yes", then generation of an optical signal is inhibited or interrupted, as indicated at operation 72. If the answer at operation 70 is "no", then the projector subsystem 12 generates an optical signal onto its associated seatback 16b, as indicated at operation 74. In this manner, each of the plurality of detector subsystems 12 continuously monitors for the presence of the wireless signal from the sensor subsystem 14. Only when this signal is not present or when the presence of an individual is detected in front of its infrared sensor 34, will a given projector subsystem 12 stop transmitting its optical signal onto its associated seatback 16b.

As mentioned previously, the system 10 of the present invention is applicable to any environment where a plurality of like structures may need to be located by an individual. Any application involving seating within a fixed structure where a plurality of seats or other structures need to be located by various individuals is within the realm of application of the present invention. Still further, any form of mobile platform having a plurality of seats or structures therein that need to be located quickly and easily by various individuals is within the realm of application of the present invention.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A system for projecting information content onto a seat located within a predefined area of a structure, when a door of the structure is opened to aid an individual in locating a specific one of said seats while said door is opened, the system comprising:
    a sensor system located adjacent said door for detecting when said door is opened;
    a projector subsystem located in front of said seat for projecting said information content onto said seat, said projector subsystem including;
        a projector for projecting an optical signal onto said seat, said optical signal containing said information content; and
        a controller for controlling said projector in accordance with said signal from said sensor.

2. The system of claim 1, further comprising a detector operably associated with said projector subsystem, for detecting the presence of an individual in said seat.

3. The system of claim 2, wherein said controller turns off said projector when said sensor indicates the presence of an individual in said seat.

4. The system of claim 2, wherein said detector comprises an infrared sensor aimed at said seat.

5. The system of claim 1, wherein said projector comprises a liquid crystal display (LCD).

6. The system of claim 1, wherein said sensor system includes a control for enabling an individual to manually enable and disable said sensor system.

7. The system of claim 1, wherein said display comprises a silk screen image display.

8. An apparatus for projecting information onto a surface when a desired condition is present in an environment in which said apparatus is located, the apparatus comprising:
    a receiver for receiving an electromagnetic signal generated when said desired condition is present;

a projection system for projecting an optical signal onto said surface to present said information in visually readable form to an individual; and a detection system to detect if an individual is present in a path of said optical signal; and wherein said projection system is responsive to a signal from said detection system to interrupt said optical signal when the presence of said individual in said path of said optical signal is detected, and also to retransmit said optical signal when said signal from said detection system abates.

9. The system of claim 8, further comprising a wireless transmitter remotely located from said receiver and disposed to detect said desired condition.

10. The system of claim 8, wherein said detection system comprises an infrared detector.

11. The system of claim 8, wherein said projection system comprises a liquid crystal display (LCD).

12. The system of claim 8, wherein said projection system comprises a silk screen image.

13. The system of claim 8, further comprising a mirror positioned adjacent said LCD for re-directing said optical signal from a first direction to a second direction.

14. The system of claim 8, further comprising a controller operably associated with said projection system and said detection system for controlling operation of said projection system and said detection system.

15. The system of claim 8, further comprising a battery for powering said projection system and said detection system.

16. A system for projecting information content onto a seat when a first condition occurs in a predefined area in which said seat is located, said system comprising:

a transmitter disposed adjacent a structural element associated with said predefined area, for generating a first signal indicating the occurrence of said first condition;

a projection subsystem located adjacent said seat so as to be facing said seat, said projection subsystem comprising:

a receiver for receiving said first signal;

a controller for receiving said first signal;

a projector for projecting an optical signal onto said seat, said optical signal providing said information content;

a detection system for detecting if an individual is present in said seat and generating a second signal indicating same; and said controller controlling said projector and said detection system in accordance with receipt of said first signal, and further in accordance with said second signal so as to turn off said projector when said second signal is present.

17. The system of claim 16, further comprising a sensor, said sensor being disposed adjacent a door of said predefined area and operable to sense when said door is opened; and wherein said sensor provides an indication of the occurrence of said first condition.

18. The system of claim 16, wherein said projector comprises a liquid crystal display (LCD).

19. The system of claim 16, wherein said projector comprises a silk screen image.

20. The system of claim 16, wherein said detection system comprises an infrared sensor.

21. The system of claim 16, wherein said projector comprises a backlight and a display, the backlight illuminating the display.

22. The system of claim 16, further comprising a switch operably associated with said detector system for enabling an individual to turn off said projection subsystem.

23. The system of claim 16, wherein said transmitter comprises a wireless transmitter and said receiver comprises a wireless receiver.

24. The system of claim 16, further comprising a control operably associated with said transmitter to allow an individual to manually enable and disable said transmitter.

25. A method of aiding an individual in locating a specific structure from a plurality of like structures in a predefined area, comprising:

disposing an projector system adjacent each one of said structures;

configuring each said projector system to generate a unique identifying message in the form of an optical signal directed at its associated said structure, to thus project a unique, optical identifying message directly onto its associated said structure that is visually readable by an individual;

using a plurality of sensors, each said sensor being independently associated with a specific one of said structures, to detect when an individual is positioned in front of a specific one of said structures; and turning off said projector system associated with said sensor that has detected the presence of said individual in front of said structure.

26. The method of claim 25, further comprising turning on all of said projector systems when a first condition occurs.

27. The method of claim 26, wherein said first condition comprises the opening of a door associated with said predefined area.

28. The method of claim 25, wherein projecting said unique, identifying optical signal onto said associated structure comprises projecting said unique, identifying optical signal onto a seat.

29. A method for identifying seats within a predetermined area, comprising:

using a plurality of projectors, with each said projector being disposed in front an associated one of said seats, to project an optical signal onto each said seat uniquely identifying each said seat; and turning off a given one of said projectors when an individual is seated in said given one of said seats.

30. A fold down seat tray comprising:

a projector system for projecting an optical signal onto a portion of an adjacently positioned seat; and an optical detection system operably associated with said projector subsystem for disabling said projector system when an individual has occupied said adjacently positioned seat.

* * * * *